United States Patent
Chan et al.

(10) Patent No.: US 11,908,136 B2
(45) Date of Patent: Feb. 20, 2024

(54) RESPIRATORY STATUS CLASSIFYING METHOD AND SYSTEM THEREOF

(71) Applicants: Taichung Veterans General Hospital, Taichung (TW); Tunghai University, Taichung (TW)

(72) Inventors: Ming-Cheng Chan, Taichung (TW); Kai-Chih Pai, Taichung (TW); Wen-Cheng Chao, Taichung (TW); Yu-Jen Huang, Taichung (TW); Chieh-Liang Wu, Taichung (TW); Min-Shian Wang, Taichung (TW); Chien-Lun Liao, Taichung (TW); Ta-Chun Hung, Taichung (TW); Yan-Nan Lin, Taichung (TW); Hui-Chiao Yang, Taichung (TW); Ruey-Kai Sheu, Taichung (TW); Lun-Chi Chen, Taichung (TW)

(73) Assignees: TAICHUNG VETERANS GENERAL HOSPITAL, Taichung (TW); TUNGHAI UNIVERSITY, Taichung (TW)

(*) Notice: Subject to any disclaimer, the term of this patent is extended or adjusted under 35 U.S.C. 154(b) by 0 days.

(21) Appl. No.: 17/935,619

(22) Filed: Sep. 27, 2022

(65) Prior Publication Data
US 2023/0368375 A1 Nov. 16, 2023

(30) Foreign Application Priority Data
May 16, 2022 (TW) .................................. 111118286

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/174* (2017.01); *G06V 10/764* (2022.01);
(Continued)

(58) Field of Classification Search
CPC . G06T 7/0012; G06T 5/50; G06T 7/11; G06T 2207/10024; G06T 2207/10036;
(Continued)

(56) References Cited

U.S. PATENT DOCUMENTS

2019/0005777 A1    1/2019  Arnone et al.
2021/0192727 A1*   6/2021  Ward ..................... G06N 3/045

FOREIGN PATENT DOCUMENTS

CN    110051324 A    7/2019
CN    113066547 A    7/2021
TW    M631912  U  *  9/2022

OTHER PUBLICATIONS

English Translation of Tw M631912 U (Year: 2022).*
(Continued)

*Primary Examiner* — Jon Chang
(74) *Attorney, Agent, or Firm* — McBee Moore & Vanik, IP, LLC

(57) ABSTRACT

A respiratory status classifying method is for classifying as one of at least two respiratory statuses and includes an original physiological parameter inputting step, an original chest image inputting step, a characteristic physiological parameter generating step, a characteristic chest image generating step, a training step and a classifier generating step. The characteristic chest image generating step includes processing at least a part of the original chest images, segmenting images of a left lung, a right lung and a heart from each of the original chest images that are processed, and enhancing image data of the images being segmented, so
(Continued)

as to generate a plurality of characteristic chest images. The training step includes training two respiratory status classifiers using a plurality of characteristic physiological parameters and the characteristic chest images by at least one machine learning algorithm.

10 Claims, 6 Drawing Sheets

(51) Int. Cl.
*G06V 10/764* (2022.01)
*G06T 7/174* (2017.01)
(52) U.S. Cl.
CPC .............. *G06T 2207/10116* (2013.01); *G06T 2207/20081* (2013.01); *G06T 2207/30048* (2013.01); *G06T 2207/30061* (2013.01); *G06V 2201/031* (2022.01)
(58) Field of Classification Search
CPC . G06T 2207/10056; G06T 2207/20221; G06T 2207/30024; G06T 2207/30096; G06T 7/174; G06T 2207/10116; G06T 2207/20081; G06T 2207/30048; G06T 2207/30061; G06V 10/46; G06V 10/764; G06V 2201/031

See application file for complete search history.

(56) References Cited

OTHER PUBLICATIONS

Rajpurkar, et al. "CheXNet: Radiologist-Level Pneumonia Detection on Chest X-Rays with Deep Learning." arXiv: 1711.05225v3 [cs.CV], Dec. 25, 2017, 7 pages (Year: 2017).*
Mo et al. "Deep Learning Based Multi-Label Chest X-Ray Classification with Entropy Weighting Loss." 12th International Symposium on Computational Intelligence and Design, Dec. 14, 2019, pp. 124-127 (Year: 2019).*

* cited by examiner

RESPIRATORY STATUS CLASSIFYING METHOD AND SYSTEM THEREOF

RELATED APPLICATIONS

This application claims priority to Taiwan Application Serial Number 111118286, filed May 16, 2022, which is herein incorporated by reference.

BACKGROUND

Technical Field

The present disclosure relates to a respiratory status classifying method and a system thereof. More particularly, the present disclosure relates to a respiratory status classifying method and a system thereof of training physiological parameters and chest images to generate a respiratory status classifier.

Description of Related Art

With increasing threat of respiratory-related diseases such as influenza and coronavirus pandemic (COVID-19) to people, medical resources are resulted to be insufficient. However, if an effective clinical decision supporting tool or system can be used to assist decision-making of the respiratory-related diseases so as to provide care to the patients, it would be beneficial to the patients, the healthcare system and the entire society.

For example, ARDS (Acute Respiratory Distress Syndrome) is a common disease in critically ill patients in the ICU (intensive care unit). Current medical evidences show that in addition to the immediate implementation of protective ventilation strategies, early use of muscle relaxants, prone ventilation and extracorporeal membrane oxygenation (ECMO) for patients with severe ARDS are all effective in reducing mortality. According to a large multinational study, about 1 in 10 critically ill patients will have ARDS, and as high as 1 in 4 patients on ventilators will have ARDS. A critically ill patient with ARDS will have the mortality rate as high as 40%. However, these patients may be ignored by the clinical medical team, and thereby the occurrences of ARDS cannot be recognized and diagnosed in time, so as not to implement the relevant diagnoses and treatment principles recommended by the evidence-based medicine. Therefore, immediately reminding the clinical medical team that the patient has occurred or is about to occur ARDS is an important part for reducing ARDS.

Given the above, how to assist the decision-making of respiratory-related diseases through an effective clinical decision supporting tool or system and further provide timely treatments for patients, has become an important subject of concern today.

SUMMARY

According to one aspect of the present disclosure, a respiratory status classifying method is for classifying as one of at least two respiratory statuses and includes an original physiological parameter inputting step, an original chest image inputting step, a characteristic physiological parameter generating step, a characteristic chest image generating step, a training step and a classifier generating step. The original physiological parameter inputting step includes inputting a plurality of original physiological parameters, which are a plurality of physiological parameters for training, and each of the original physiological parameters corresponds to a corresponding one of the respiratory statuses. The original chest image inputting step includes inputting a plurality of original chest images, which are a plurality of chest images for training, and each of the original chest images corresponds to a corresponding one of the respiratory statuses. The characteristic physiological parameter generating step includes processing at least a part of the original physiological parameters, so as to generate a plurality of characteristic physiological parameters. The characteristic chest image generating step includes processing at least a part of the original chest images, segmenting images of a left lung, a right lung and a heart from each of the original chest images that are processed, and enhancing image data of the images being segmented, so as to generate a plurality of characteristic chest images. The training step includes training two respiratory status classifiers using the characteristic physiological parameters and the characteristic chest images by at least one machine learning algorithm. The classifier generating step includes generating at least one respiratory status classifier after training by the at least one machine learning algorithm, so as to classify as one of the at least two respiratory statuses.

According to another aspect of the present disclosure, a respiratory status classifying system is for classifying as one of at least two respiratory statuses and includes at least one processor and at least one program storage medium. The at least one program storage medium is coupled to the processor and configured to provide a respiratory status classifier generating program. The processor based on the respiratory status classifier generating program is configured to: process at least a part of a plurality of original physiological parameters, which are a plurality of physiological parameters for training, so as to generate a plurality of characteristic physiological parameters, wherein each of the original physiological parameters corresponds to a corresponding one of the respiratory statuses; process at least a part of a plurality of original chest images, which are a plurality of chest images for training, segment images of a left lung, a right lung and a heart from each of the original chest images that are processed, and enhance image data of the images being segmented, so as to generate a plurality of characteristic chest images, wherein each of the original chest images corresponds to a corresponding one of the respiratory statuses; train the characteristic physiological parameters and the characteristic chest images by at least one machine learning algorithm; and generate at least one respiratory status classifier after training by the at least one machine learning algorithm, so as to classify as one of the at least two respiratory statuses.

BRIEF DESCRIPTION OF THE DRAWINGS

The present disclosure can be more fully understood by reading the following detailed description of the embodiment, with reference made to the accompanying drawings as follows.

DETAILED DESCRIPTION

The present disclosure will now be described more specifically with reference to the following embodiments. It is to be noted that the following descriptions of preferred embodiments of this disclosure are presented herein for the purposes of illustration and description only; it is not intended to be exhaustive or to be limited to the precise form disclosed.

In addition, the terms first, second, third, etc. are used herein to describe various elements or components, these elements or components should not be limited by these terms. Consequently, a first element or component discussed below could be termed a second element or component.

Figure 1A:
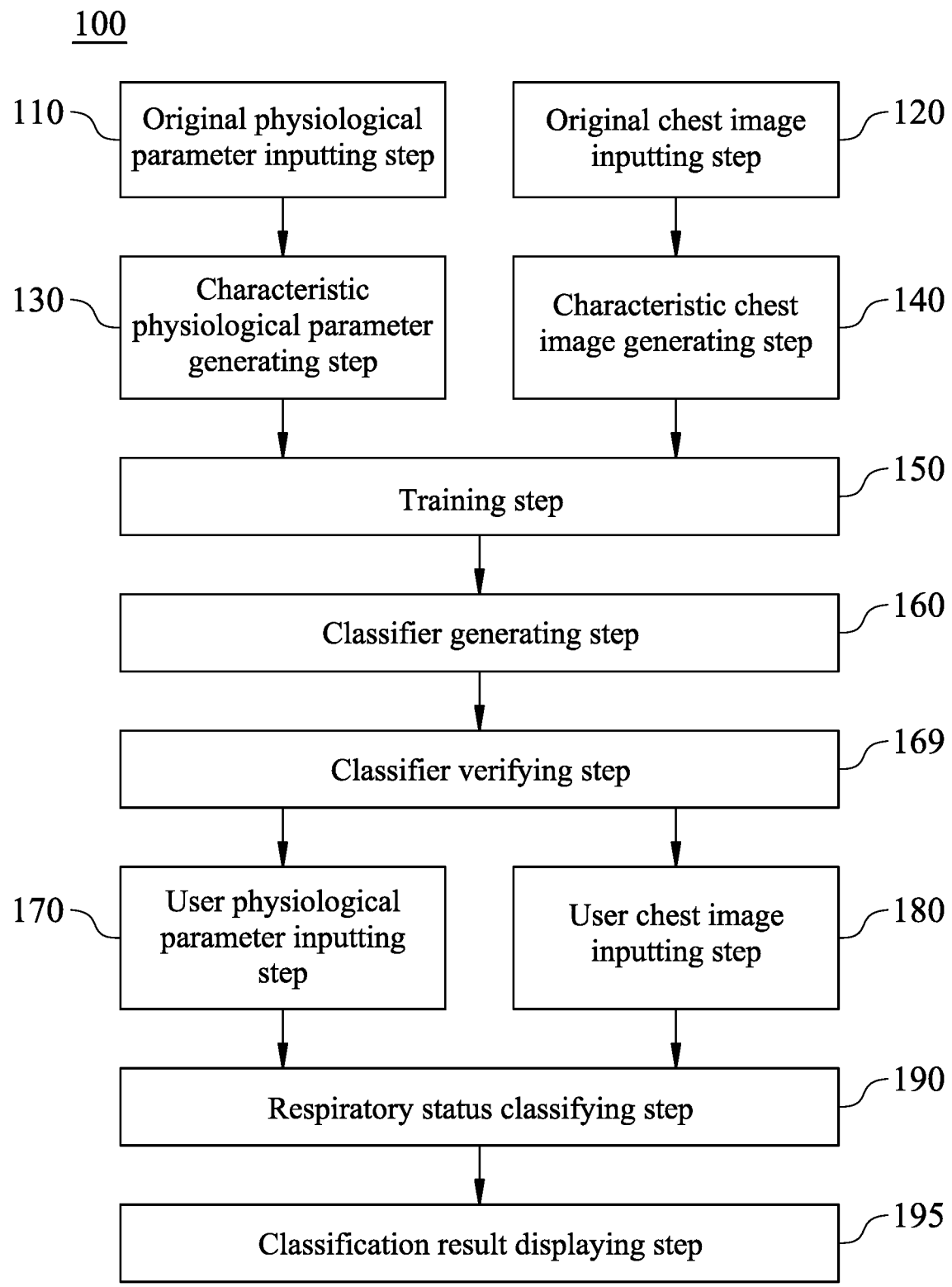
FIG. 1A is a flow chart of a respiratory status classifying method according to the 1st embodiment of the present disclosure.

FIG. 1A is a flow chart of a respiratory status classifying method 100 according to the 1st embodiment of the present disclosure. With reference to FIG. 1A, a respiratory status classifying method 100 is for classifying a status of a user as one of at least two respiratory statuses and includes an original physiological parameter inputting step 110, an original chest image inputting step 120, a characteristic physiological parameter generating step 130, a characteristic chest image generating step 140, a training step 150 and a classifier generating step 160.

The original physiological parameter inputting step 110 includes inputting a plurality of original physiological parameters, which are a plurality of physiological parameters for training, and each of the original physiological parameters corresponds to a corresponding one of the respiratory statuses. The original chest image inputting step 120 includes inputting a plurality of original chest images, which are a plurality of chest images (thoracic images) for training, and each of the original chest images corresponds to a corresponding one of the respiratory statuses. The characteristic physiological parameter generating step 130 includes processing (i.e., pre-processing) at least a part of the original physiological parameters, so as to generate a plurality of characteristic physiological parameters. The characteristic chest image generating step 140 includes processing (i.e., pre-processing) at least a part of the original chest images, segmenting images of a left lung, a right lung and a heart from each of the original chest images that are processed, and enhancing image data of the images being segmented, so as to generate a plurality of characteristic chest images. The training step 150 includes training two respiratory status classifiers using the characteristic physiological parameters and the characteristic chest images by at least one machine learning algorithm. The classifier generating step 160 includes generating at least one respiratory status classifier (i.e., respiratory status model) after training by the at least one machine learning algorithm, so as to classify the status of the user as one of the at least two respiratory statuses. Therefore, it is beneficial to simultaneously consider the characteristics of the physiological parameters and the chest images to generate a reliable respiratory status classifier.

In detail, the respiratory status classifying method 100 may be a clinical decision supporting method of an ARDS (Acute Respiratory Distress Syndrome) to implement a clinical decision supporting system of the ARDS, and the at least two respiratory statuses are respiratory statuses of the ARDS and a non-ARDS, respectively. Therefore, the respiratory status classifying method 100 is for establishing an AI (artificial intelligence)-assisting diagnosis model for the ARDS, and the purpose is to integrate information related to medical routines, assist front line staff, improve work efficiency and reduce workload. Using the physiological parameters and the chest images to establish an automatic data processing module has the functions of real-time collection, data cleaning automatically and structured storage. The inference engine providing the relevant information on the diagnosis and treatment of the ARDS is beneficial to timely give the appropriate treatment, improve the quality of diagnosis and treatment, enhance the treatment outcomes, and thereby reduce the mortality. Further, through the decision supporting system providing warnings and treatment recommendations, the interactive modules collecting the feedback information from the medical personnel, the information provided back for training to the model training module by the post-processing module can be cyclically used for the model training and application.

In the original physiological parameter inputting step 110, the original physiological parameters may include at least one clinical parameter, at least one ventilator parameter and at least one laboratory parameter of a patient in ICU (intensive care unit). The clinical parameter includes at least one of a body temperature, a respiration, a pulse, a systolic blood pressure, a blood oxygen and a urine output. The ventilator parameter includes at least one of a fraction of inspired oxygen (FiO2), a positive end-expiratory pressure (PEEP), a peak airway pressure (PAW), a mean airway pressure (MAP), a respiratory rate (RR) and a tidal volume (VT). The laboratory parameter includes at least one of a procalcitonin (PCT), a partial pressure of arterial carbon dioxide ($PaCO_2$) and a partial pressure of arterial oxygen ($PaO_2$). Therefore, it is beneficial to generate a reliable respiratory status classifier from the physiological parameters related to the respiratory statuses to be classified.

Furthermore, each of the clinical parameter, the ventilator parameter and the laboratory parameter may be an average value in a time period, which is between 12 hours and 72 hours (including 12 hours and 72 hours), and the time period of each of the clinical parameter and the ventilator parameter is smaller than the time period of the laboratory parameter. Therefore, it is advantageous in simultaneously achieving the accuracy of the classifier and the appropriate number of the characteristic values. In the 1st embodiment, the time period of each of the clinical parameter and the ventilator parameter is 24 hours, and the two average values in two respective and consecutive 24 hours are used, that is, a total of 48 hours is used. The time period of the laboratory parameter is 48 hours. Thus, the time period of each of the clinical parameter and the ventilator parameter is smaller than the time period of the laboratory parameter.

In the characteristic physiological parameter generating step 130, a number of the characteristic physiological parameters may be between 15 and 25 (including 15 and 25). Therefore, it is beneficial to generate an effective respiratory status classifier via a proper number of the characteristic values. In the 1st embodiment, after proceeding the characteristics engineering and selecting, the number of the characteristic physiological parameters may be 21 for model training and verifying.

In the original chest image inputting step 120, each of the original chest images may be an X-ray chest image, and at least a part of the original chest images may be a Chest X-ray 14 dataset published by National Institutes of Health (NIH), which has 15 types (kinds) of chest symptoms labels (14 types of the chest symptoms labels plus no chest symptom found, so a total of 15 types) being labeled thereon. Accordingly, it is beneficial to the diversity and objectivity of chest image sampling.

In the characteristic chest image generating step 140, a ratio of a number of the characteristic chest images corresponding to the ARDS to a number of the characteristic chest images corresponding to the non-ARDS may be between 0.8 and 1.2 (including 0.8 and 1.2). Therefore, it is advantageous in generating a classifier for effectively screening the ARDS via the appropriate quantitative ratio. In the 1st embodiment, down sampling may be performed to make the ratio equal to 1.

Moreover, in the specific process of pre-processing the original chest images, it includes converting the original chest images from dcm format to png format, adjusting the original chest images to a consistent size or normalizing, and removing black borders or removing blank part around. Next, the images of the left lung, the right lung and the heart in each of the processed chest images for training are segmented by a Mask R-CNN (regional convolutional neural network), and the images are cropped according to the segmentation. In this way, the characteristic chest image inputting to the image training module only includes the chest cavity, so as to avoid the image of the parts outside the chest cavity and below the diaphragm from interfering with the interpretation. Then, for example, the size of the X-ray image after image segmentation is adjusted from 1024 pixels*1024 pixels to 224 pixels*224 pixels, and then each image enhanced to 5 times via rotating and scale jittering are generated for the subsequent training step 150.

Figure 1B:
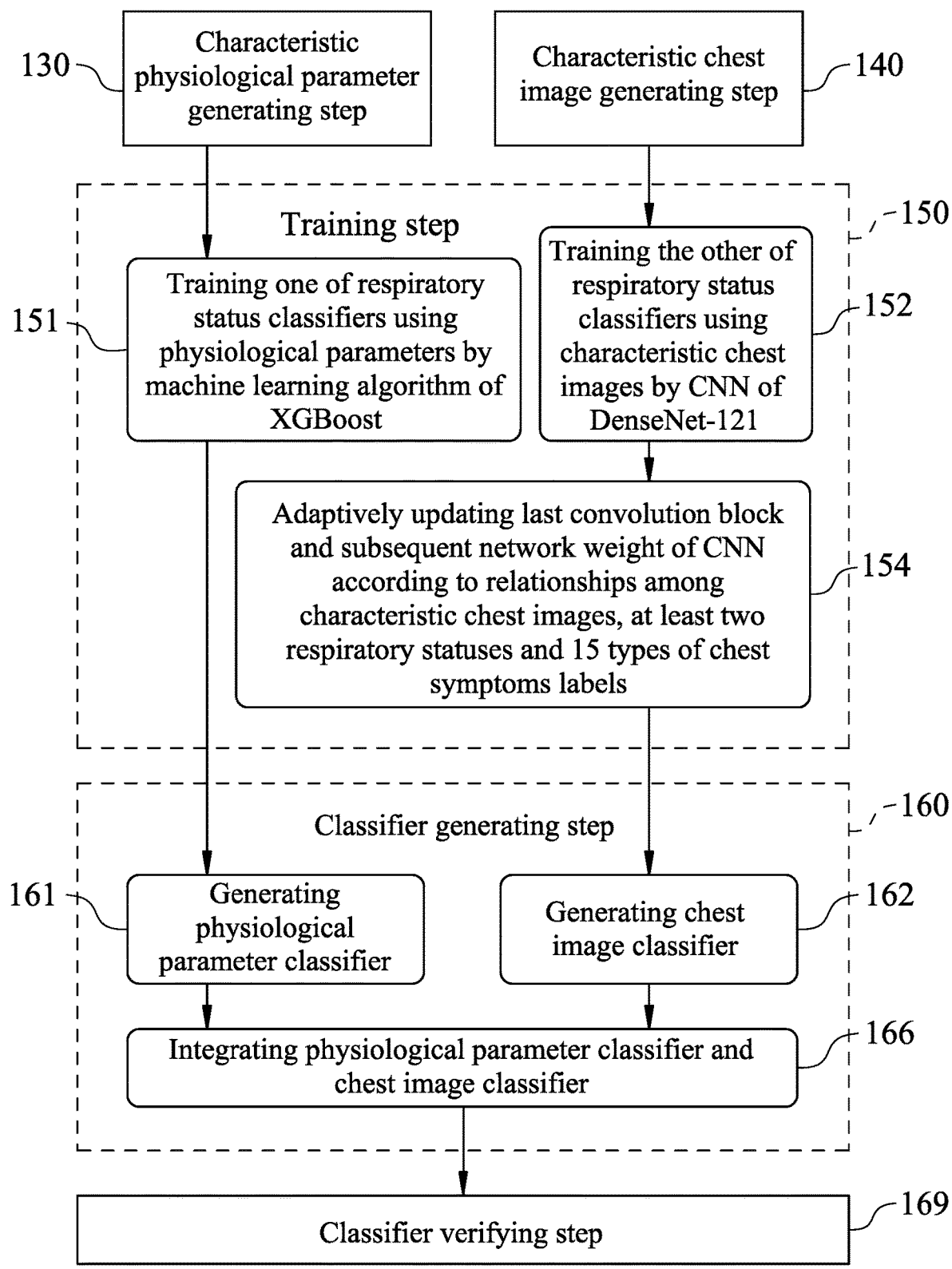
FIG. 1B is a part of the flow chart of the respiratory status classifying method according to the 1st embodiment.

FIG. 1B is a part of the flow chart of the respiratory status classifying method 100 according to the 1st embodiment. With reference to FIG. 1B, the training step 150 may include steps 151, 152, 154. The step 151 is related to the training of the physiological parameters and includes training one of the two respiratory status classifiers using the characteristic physiological parameters by machine learning algorithm of XGBoost (Extreme Gradient Boosting).

The steps 152, 154 are related to the training of the chest images by a method of transfer learning, and are divided into two stages of the steps 152, 154. The step 152 includes training the other of the two respiratory status classifiers using the characteristic chest images by a CNN (convolutional neural network) of DenseNet-121. In detail, the step 152 includes training the other of the two respiratory status classifiers using the pre-trained characteristic chest images of the Chest X-ray 14 dataset published by National Institutes of Health, and the characteristic chest images are labeled with the 15 types of the chest symptoms labels. Next, the CNN of DenseNet-121 with ImageNet as the initial weight is used to train each of characteristic chest images to classify, and the characteristic chest images have corresponding relationships with 15 types of the chest symptoms labels for extracting the features of the chest symptoms. The step 154 includes adaptively updating a last convolution block and a subsequent network weight of the CNN for fine-tuning a chest image classifier 226 according to relationships among the characteristic chest images, the at least two respiratory statuses and the 15 types of the chest symptoms labels. Specifically, the model weights of the trained Chest X-ray 14 dataset are reapplied to the classification of the ARDS to adaptively update the last convolutional block and the subsequent network weight of the CNN for fine-tuning the chest image classifier 226, which is one of the respiratory status classifiers in the subsequent classifier generating step 160 (e.g., the chest image classifier 226 in FIG. 2A and FIG. 2B). Therefore, taking the ARDS as an example, it is a common disease in the ICU and the main cause of death from severe influenza and coronavirus pandemic. Patients with the ARDS have a very high mortality rate, but they may be ignored or delayed in the clinical practice so as to fail to be implemented with the principles of treatment recommended by the clinical guidelines. The diagnosis of the ARDS must integrate the physiological parameters and the chest image findings to make a comprehensive judgment. Among them, the interpretation of the X-ray chest image and the comprehensive judgment to exclude simple pulmonary edema often require the extensive clinical experience, and it is also one of the reasons why the diagnosis and the treatment of the ARDS are not ideal and the mortality rate is high. Thus, it is an urgent need to timely integrate the clinical data, the ventilator-related parameters, the laboratory data and the chest images and then use data logic technology to convert information to assist the medical personnel of the front line in diagnosis and treatment. The results generated by the classifier (i.e., the inference engine) to provide the professionals with medical decision-making are advantageous not only in improving the overall quality of critical care and enhancing the survival rate of critically ill patients, but also in sharing the pressure of the clinical work and reducing the load of front line personnel.

In the step 152 of the training step 150, an initial learning rate of the characteristic chest images may be between $10^{-5}$ and $10^{-3}$ (including $10^{-5}$ and $10^{-3}$), and a decreasing rate per 10 epochs may be between 0.01 times and 0.1 times (including 0.01 times and 0.1 times). Accordingly, it is beneficial to effectively generate the chest image classifier 226. In the 1st embodiment, down sampling is performed to have the ratio of the number of the characteristic chest images corresponding to the ARDS to the number of the characteristic chest images corresponding to the non-ARDS being 1, and each of the number of the characteristic chest images corresponding to the ARDS and the number of the characteristic chest images corresponding to the non-ARDS is 360. The loss function is used with cross entropy, and the optimizer is used with Adam. The initial learning rate of the characteristic chest images is $10^{-4}$, and the decreasing rate per 10 epochs is 0.1 times.

Figure 2A:
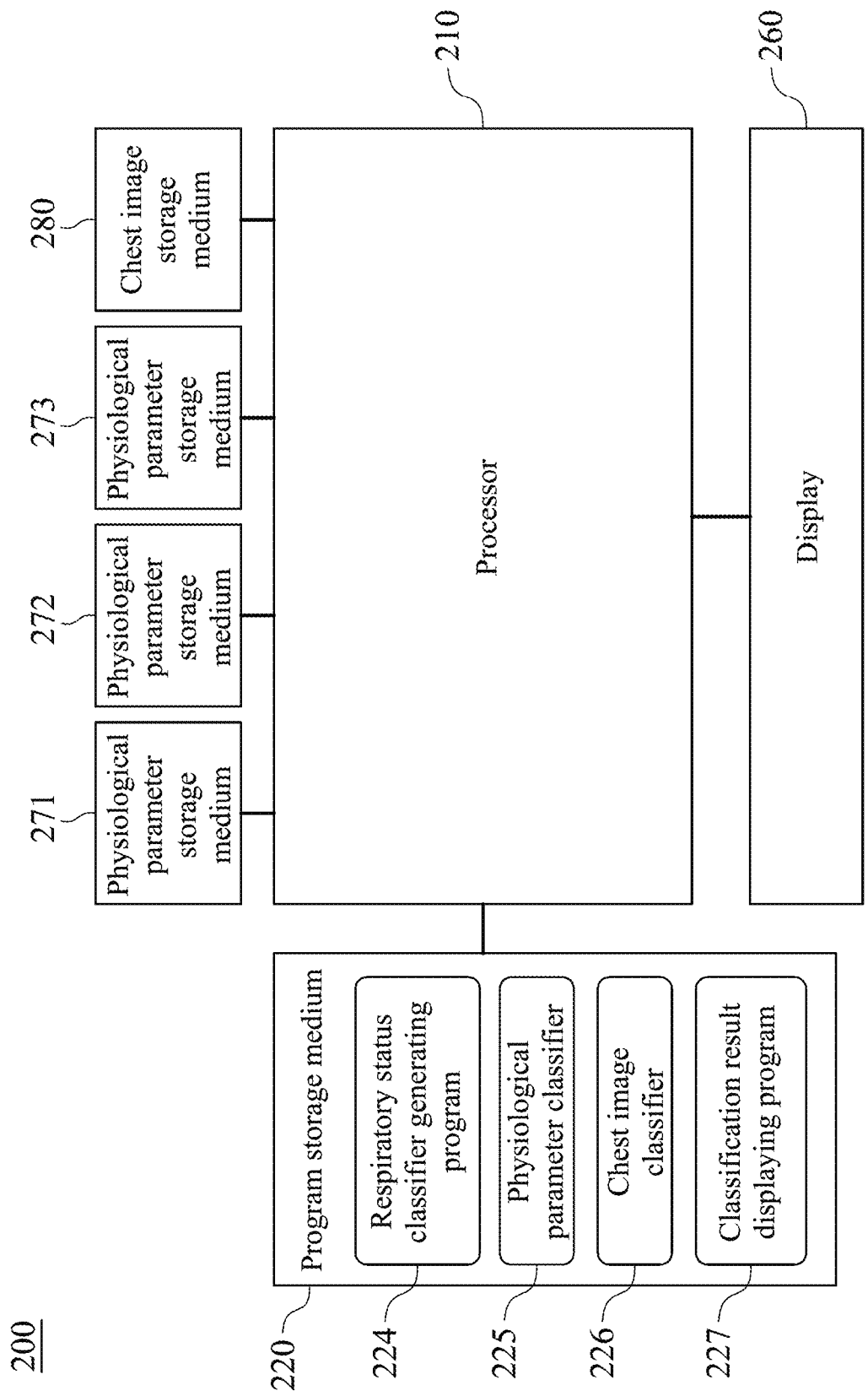
FIG. 2A is a block diagram of a respiratory status classifying system according to the 2nd embodiment of the present disclosure.
Figure 2B:
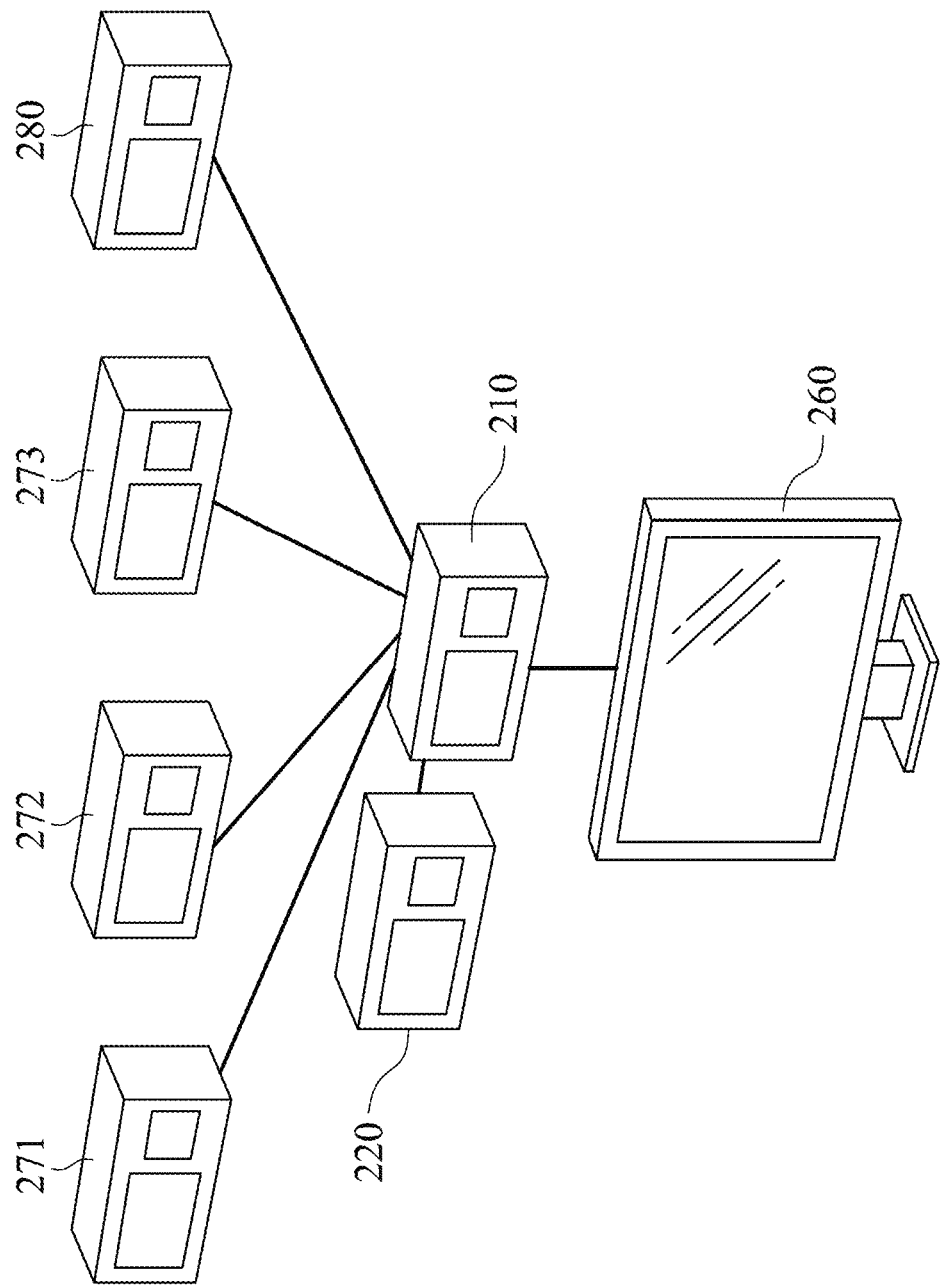
FIG. 2B is a schematic view of the respiratory status classifying system according to the 2nd embodiment.

FIG. 2A is a block diagram of a respiratory status classifying system 200 according to the 2nd embodiment of the present disclosure, and FIG. 2B is a schematic view of the respiratory status classifying system 200 according to the 2nd embodiment. With reference to FIG. 1A, FIG. 1B, FIG. 2A and FIG. 2B, the respiratory status classifying method 100 of the 1st embodiment is described with an aid of the respiratory status classifying system 200 of the 2nd embodiment of the present disclosure. The classifier generating step 160 may include steps 161, 162, 166. A number of the at least one respiratory status classifier may be two, and the two respiratory status classifiers are a physiological parameter classifier 225 and the chest image classifier 226, respectively. The step 161 includes generating the physiological parameter classifier 225, and the step 162 includes generating the chest image classifier 226. The step 166 includes integrating the physiological parameter classifier 225 and the chest image classifier 226. Specifically, a subsequent respiratory status classifying step 190 includes classifying a user as one of the respiratory statuses according to an average value of two output probabilities of the physiological parameter classifier 225 and the chest image classifier 226, respectively. For example, if a threshold value of the average value of the output probabilities for the ARDS is set as 0.5, it is determined as the ARDS while the average value of the output probabilities being greater than or equal to 0.5, and it is determined as the non-ARDS while the average value of the output probabilities being smaller than 0.5. Therefore, considering the characteristics of the physiological parameters and the chest images is advantageous in generating the reliable respiratory status classifiers.

With reference to FIG. 1A and FIG. 1B, the respiratory status classifying method 100 may further include a classifier verifying step 169, which includes verifying the respiratory status classifiers with another part of the original physiological parameters and another part of the original chest images. For example, the respiratory status classifying method 100 includes dividing each of a dataset of the original physiological parameters and a dataset of the original chest images into an original dataset used in the training step 150 and a verification dataset used in the classifier verifying step 169, which are accounting for 80% and 20% of each dataset, respectively. The original dataset is used for training the classifiers, and finally the verification dataset is used for observing the verifying results. Each of the training step 150 and the classifier verifying step 169 adopts a 5-fold cross-verifying method. That is, each dataset is divided into five equal parts, and each equal part is used as the original dataset and the verification dataset in turn, five results are obtained after five times of training and verifying the classifiers, and the consistency of the classifier training is checked by the average of the five results.

The respiratory status classifying method 100 may further include a user physiological parameter inputting step 170, a user chest image inputting step 180, the respiratory status classifying step 190 and a classification result displaying step 195. The user physiological parameter inputting step 170 includes measuring a plurality of user physiological parameters of a user (e.g., a patient), and inputting the user physiological parameters to the physiological parameter classifier 225 of the respiratory status classifiers. The user chest image inputting step 180 includes taking a user chest image of the user, and inputting the user chest image to the chest image classifier 226 of the respiratory status classifiers. The respiratory status classifying step 190 includes classifying the user as one of the respiratory statuses according to the user physiological parameters and the user chest image via the respiratory status classifiers. The classification result displaying step 195 includes displaying a classification result by a display 260. Accordingly, the assistance of the respiratory status classifiers with simultaneously considerations of the physiological parameters and the chest images is beneficial to timely give patients with appropriate treatments.

With reference to FIG. 2A and FIG. 2B, the respiratory status classifying system 200 according to the 2nd embodiment of the present disclosure is for classifying as one of the at least two respiratory statuses and includes at least one processor 210 and at least one program storage medium 220. The at least one program storage medium 220 is coupled to the processor 210 and configured to provide a respiratory status classifier generating program 224. The processor 210 based on the respiratory status classifier generating program 224 is configured to: process at least a part of the original physiological parameters, which are the physiological parameters for training, so as to generate the characteristic physiological parameters, wherein each of the original physiological parameters corresponds to a corresponding one of the respiratory statuses; process at least a part of the original chest images, which are the chest images for training, segment the images of the left lung, the right lung and the heart from each of the original chest images that are processed, and enhance the image data of the images being segmented, so as to generate the characteristic chest images, wherein each of the original chest images corresponds to a corresponding one of the respiratory statuses; train the characteristic physiological parameters and the characteristic chest images by at least one machine learning algorithm; and generate at least one respiratory status classifier after training by the at least one machine learning algorithm, so as to classify as one of the at least two respiratory statuses. Therefore, it is beneficial to simultaneously consider the characteristics of the physiological parameters and the chest images to generate the reliable respiratory status classifier.

In detail, the number of the at least one respiratory status classifier may be two, the two respiratory status classifiers are the physiological parameter classifier 225 and the chest image classifier 226, respectively. The processor 210 based on the respiratory status classifier generating program 224 is further configured to classify as one of the at least two respiratory statuses according to the average value of output probabilities of the physiological parameter classifier 225 and the chest image classifier 226.

The respiratory status classifying system 200 may further include physiological parameter storage mediums 271, 272, 273 and a chest image storage medium 280. The physiological parameter storage mediums 271, 272, 273 are coupled to the processor 210 and configured to provide the at least one clinical parameter, the at least one ventilator parameter and the at least one laboratory parameter, respectively, of the user physiological parameters of the user. The chest image storage medium 280 is coupled to the processor 210 and configured to provide the user chest image of the user. The at least one program storage medium 220 is further configured to provide the respiratory status classifiers (i.e., the physiological parameter classifier 225 and the chest image classifier 226), and the processor 210 based on the respiratory status classifiers is further configured to classify the user as one of the respiratory statuses according to the user physiological parameters and the user chest image via the respiratory status classifiers. Moreover, each of the program storage medium 220, the physiological parameter storage mediums 271, 272, 273 and the chest image storage medium 280 may specifically be a local or cloud non-transitory computer-readable storage medium, and each of the processor 210, the program storage medium 220, the physiological parameter storage mediums 271, 272, 273 and the chest image storage medium 280 may specifically be a single device, a part of a single device, or a plurality of devices.

Figure 2C:
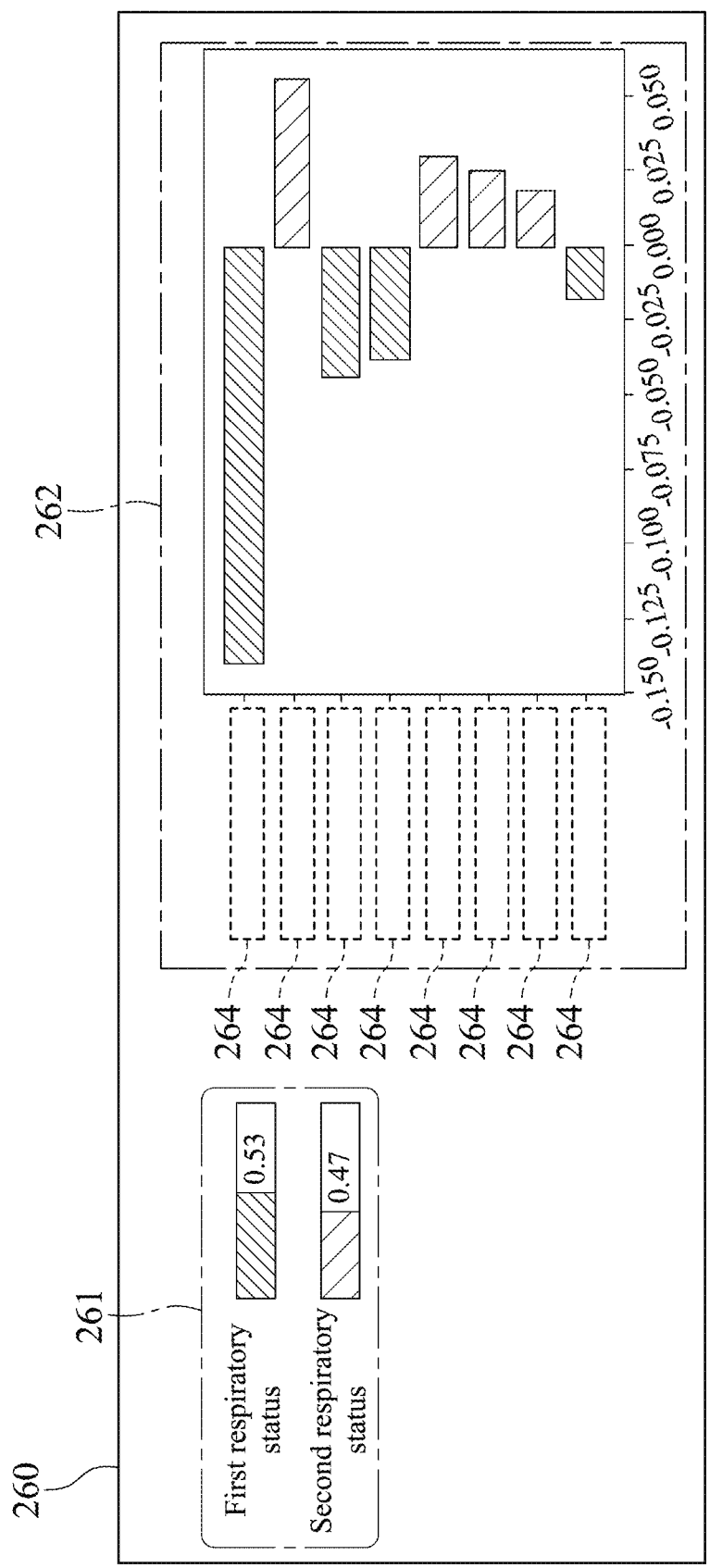
FIG. 2C is a schematic view displaying a classification result of the respiratory status classifying system according to the 2nd embodiment.

FIG. 2C is a schematic view displaying the classification result of the respiratory status classifying system 200 according to the 2nd embodiment. With reference to FIG. 2A to FIG. 2C, the respiratory status classifying system 200 may further include the display 260 coupled to the processor 210. The program storage medium 220 is further configured to provide a classification result displaying program 227, and the processor 210 based on the classification result displaying program 227 is further configured to display the classification results via the display 260. The classification results include output probabilities of the at least two respiratory statuses, respectively, as shown in a respiratory status probability block 261 in FIG. 2C. For example, the respiratory status probability block 261 shows that an output probability being 0.53 of the first respiratory status is greater than an output probability being 0.47 of the second respiratory status. When the first respiratory status corresponds to the non-ARDS, and the second respiratory status corresponds to the ARDS, it indicates that the user is classified as the non-ARDS. Therefore, through integrating the physiological parameter classifier 225 and the chest image classifier 226, the ARDS risk probabilities outputted from the respective predicting models of the physiological parameters (e.g., the clinical data) and the chest image can be integrated. Then, a final ARDS risk probability for diagnosis is given, and the output data for interpreted are provided references for physicians' clinical diagnosis.

Figure 2F:
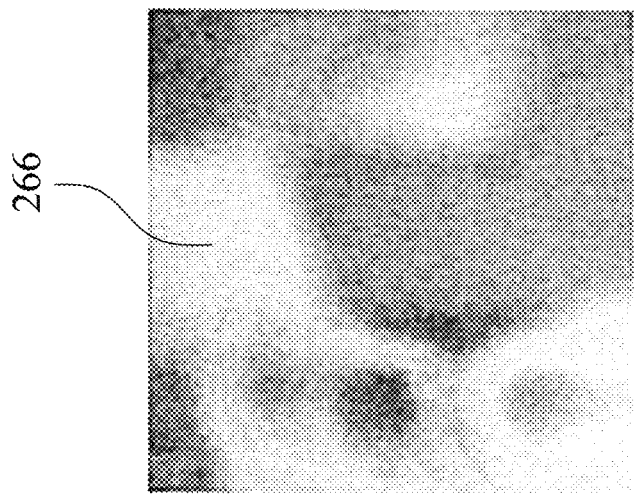
FIG. 2F is a schematic view displaying a classification result related to further another chest image of the respiratory status classifying system according to the 2nd embodiment.
Figure 2E:
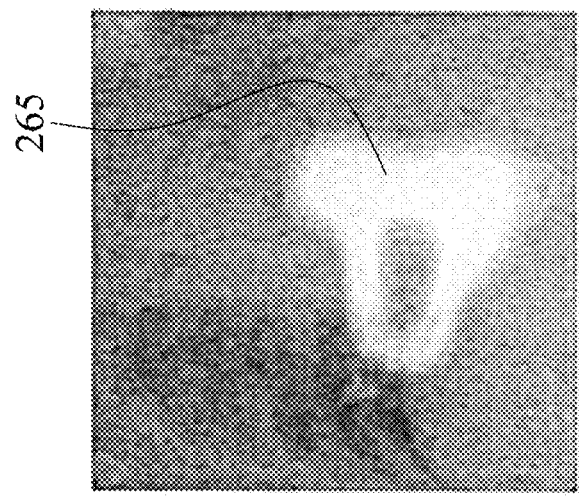
FIG. 2E is a schematic view displaying a classification result related to another chest image of the respiratory status classifying system according to the 2nd embodiment.
Figure 2D:
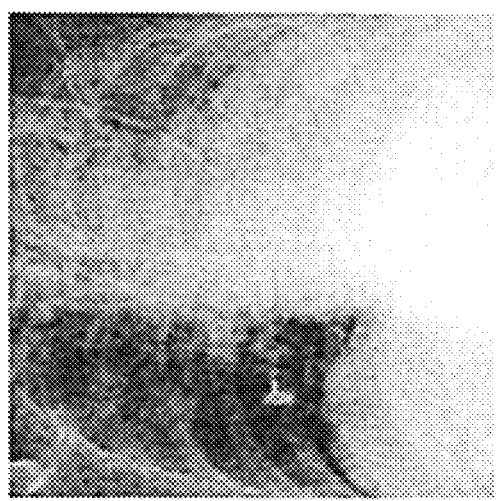
FIG. 2D is a schematic view displaying a classification result related to a chest image of the respiratory status classifying system according to the 2nd embodiment.

FIG. 2D, FIG. 2E and FIG. 2F are schematic views displaying classification results related to chest images of the respiratory status classifying system 200 according to the 2nd embodiment. With reference to FIG. 2C to FIG. 2F, the classification results may further include a physiological parameter interpretation block 262 (as shown in FIG. 2C), which includes correlation values of each of the physiological parameters 264 with the first respiratory status (left bars) and the second respiratory status (right bars). Moreover, the classification results may further include an original user chest image (as shown in FIG. 2D), a negative focus 265 (as shown in FIG. 2E) corresponding to the first respiratory status being the non-ARDS on the user chest image, and a positive focus 266 (as shown in FIG. 2F) corresponding to the second respiratory status being the ARDS on the user chest image. Accordingly, an automatic respiratory status classifiers of the ARDS applying the present disclosure not only reminds the risk probability, but also presents the patient's data and X-ray images in a visualized manner, so as to provide physicians with the key points of data interpreted by the automatic classifier and the important positions required to be cared on images, for assisting the physicians in the diagnosis and interpretation of the ARDS.

Regarding other details of the respiratory status classifying system 200 of the 2nd embodiment, the contents of the respiratory status classifying method 100 of the 1st embodiment can be referred, and the details are not described again herein.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A respiratory status classifying method, being for classifying as one of at least two respiratory statuses, and comprising:

an original physiological parameter inputting step comprising inputting a plurality of original physiological parameters, which are a plurality of physiological parameters for training, wherein each of the original physiological parameters corresponds to a corresponding one of the respiratory statuses, the original physiological parameters comprise at least one clinical parameter, at least one ventilator parameter and at least one laboratory parameter, each of the clinical parameter, the ventilator parameter and the laboratory parameter is an average value in a time period, which is between 12 hours and 72 hours, and the time period of each of the clinical parameter and the ventilator parameter is smaller than the time period of the laboratory parameter;

an original chest image inputting step comprising inputting a plurality of original chest images, which are a plurality of chest images for training, wherein each of the original chest images corresponds to a corresponding one of the respiratory statuses and is an X-ray chest image, and at least a part of the original chest images is a Chest X-ray 14 dataset published by National Institutes of Health (NIH), which has 15 types of chest symptoms labels being labeled thereon;

a characteristic physiological parameter generating step comprising processing at least a part of the original physiological parameters, so as to generate a plurality of characteristic physiological parameters;

a characteristic chest image generating step comprising processing at least a part of the original chest images, segmenting images of a left lung, a right lung and a heart from each of the original chest images that are processed, and enhancing image data of the images being segmented, so as to generate a plurality of characteristic chest images;

a training step comprising training one of two respiratory status classifiers using the characteristic physiological parameters by a machine learning algorithm, and training the other of the two respiratory status classifiers using the characteristic chest images by a CNN (convolutional neural network) of DenseNet-121, wherein the characteristic chest images are labeled with the 15 types of chest symptoms labels; and a classifier generating step comprising generating the two respiratory status classifiers after training by the machine learning algorithm and the CNN, respectively, wherein the two respiratory status classifiers are a physiological parameter classifier and a chest image classifier, respectively, which are for classifying as one of the at least two respiratory statuses, and a last convolution block and a subsequent network weight of the CNN are adaptively updated for fine-tuning the chest image classifier according to relationships among the characteristic chest images, the at least two respiratory statuses and the 15 types of chest symptoms labels.

2. The respiratory status classifying method of claim 1, wherein the clinical parameter comprises at least one of a body temperature, a respiration, a pulse, a systolic blood pressure, a blood oxygen and a urine output, the ventilator parameter comprises at least one of a fraction of inspired oxygen (FiO2), a positive end-expiratory pressure (PEEP), a peak airway pressure (PAW), a mean airway pressure (MAP), a respiratory rate (RR) and a tidal volume (VT), and the laboratory parameter comprises at least one of a procalcitonin (PCT), a partial pressure of arterial carbon dioxide ($PaCO_2$) and a partial pressure of arterial oxygen ($PaO_2$);

wherein a number of the characteristic physiological parameters is between 15 and 25.

3. The respiratory status classifying method of claim 1, further comprising:

a classifier verifying step comprising verifying the physiological parameter classifier and the chest image classifier with another part of the original physiological parameters and another part of the original chest images, respectively;

a user physiological parameter inputting step comprising measuring a plurality of user physiological parameters of a user, and inputting the user physiological parameters to the physiological parameter classifier;

a user chest image inputting step comprising taking a user chest image of the user, and inputting the user chest image to the chest image classifier; and a respiratory status classifying step comprising classifying the user as one of the respiratory statuses by the physiological parameter classifier and the chest image classifier according to the user physiological parameters and the user chest image.

4. The respiratory status classifying method of claim 1, wherein the respiratory status classifying method is a clinical decision supporting method of an ARDS (Acute Respiratory Distress Syndrome), and the at least two respiratory statuses are respiratory statuses of the ARDS and a non-ARDS, respectively.

5. The respiratory status classifying method of claim 4, wherein in the classifier generating step, the physiological parameter classifier and the chest image classifier are for classifying as one of the at least two respiratory statuses according to an average value of output probabilities of the physiological parameter classifier and the chest image classifier.

6. The respiratory status classifying method of claim 5, wherein in the characteristic chest image generating step, a ratio of a number of the characteristic chest images corresponding to the ARDS to a number of the characteristic chest images corresponding to the non-ARDS is between 0.8 and 1.2;

wherein in the training step, an initial learning rate of the characteristic chest images is between $10^{-5}$ and $10^{-3}$, and a decreasing rate per 10 epochs is between 0.01 times and 0.1 times.

7. A respiratory status classifying system, being for classifying as one of at least two respiratory statuses, and comprising:

at least one processor;

at least one program storage medium coupled to the processor and configured to provide a respiratory status classifier generating program;

wherein the processor based on the respiratory status classifier generating program is configured to:

process at least a part of a plurality of original physiological parameters, which are a plurality of physiological parameters for training, so as to generate a plurality of characteristic physiological parameters, wherein each of the original physiological parameters corresponds to a corresponding one of the respiratory statuses, the original physiological parameters comprise at least one clinical parameter, at least one ventilator parameter and at least one laboratory parameter, the clinical parameter comprises at least one of a body temperature, a respiration, a pulse, a systolic blood pressure, a blood oxygen and a urine output, the ventilator parameter comprises at least one of a fraction of inspired oxygen, a positive end-expiratory pressure, a peak airway pressure, a mean airway pressure, a respiratory rate and a tidal volume, the laboratory parameter comprises at least one of a procalcitonin, a partial pressure of arterial carbon dioxide and a partial pressure of arterial oxygen, each of the clinical parameter, the ventilator parameter and the laboratory parameter is an average value in a time period, which is between 12 hours and 72 hours, and the time period of each of the clinical parameter and the ventilator parameter is smaller than the time period of the laboratory parameter;

process at least a part of a plurality of original chest images, which are a plurality of chest images for training, segment images of a left lung, a right lung and a heart from each of the original chest images that are processed, and enhance image data of the images being segmented, so as to generate a plurality of characteristic chest images, wherein each of the original chest images corresponds to a corresponding one of the respiratory statuses and is an X-ray chest image, and at least a part of the original chest images is a Chest X-ray 14 dataset published by National Institutes of Health, which has 15 types of chest symptoms labels being labeled thereon;

train one of two respiratory status classifiers using the characteristic physiological parameters by a machine learning algorithm;

train the other of the two respiratory status classifiers using the characteristic chest images by a CNN of DenseNet-121, wherein the characteristic chest images are labeled with the types of the chest symptoms labels; and generate the two respiratory status classifiers after training by the machine learning algorithm and the CNN, respectively, wherein the two respiratory status classifiers are a physiological parameter classifier and a chest image classifier, respectively, which are for classifying as one of the at least two respiratory statuses, and a last convolution block and a subsequent network weight of the CNN are adaptively updated for fine-tuning the chest image classifier according to relationships among the characteristic chest images, the at least two respiratory statuses and the 15 types of chest symptoms labels.

8. The respiratory status classifying system of claim 7, further comprising:

at least one physiological parameter storage medium coupled to the processor and configured to provide a plurality of user physiological parameters of a user; and a chest image storage medium coupled to the processor and configured to provide a user chest image of the user;

wherein the at least one program storage medium is further configured to provide the physiological parameter classifier and the chest image classifier, and the processor based on the physiological parameter classifier and the chest image classifier is further configured to:

classify the user as one of the respiratory statuses by the physiological parameter classifier and the chest image classifier according to the user physiological parameters and the user chest image.

9. The respiratory status classifying system of claim 7, wherein the respiratory status classifying system is a clinical decision supporting system of an ARDS (Acute Respiratory Distress Syndrome), and the at least two respiratory statuses are respiratory statuses of the ARDS and a non-ARDS, respectively.

10. The respiratory status classifying system of claim 9, wherein the processor based on the respiratory status classifier generating program is further configured to:

classify as one of the at least two respiratory statuses according to an average value of output probabilities of the physiological parameter classifier and the chest image classifier.

* * * * *